May 25, 1965
R. SANDERS
3,184,845
NAVIGATION INSTRUMENT
Filed Nov. 16, 1960
2 Sheets-Sheet 1
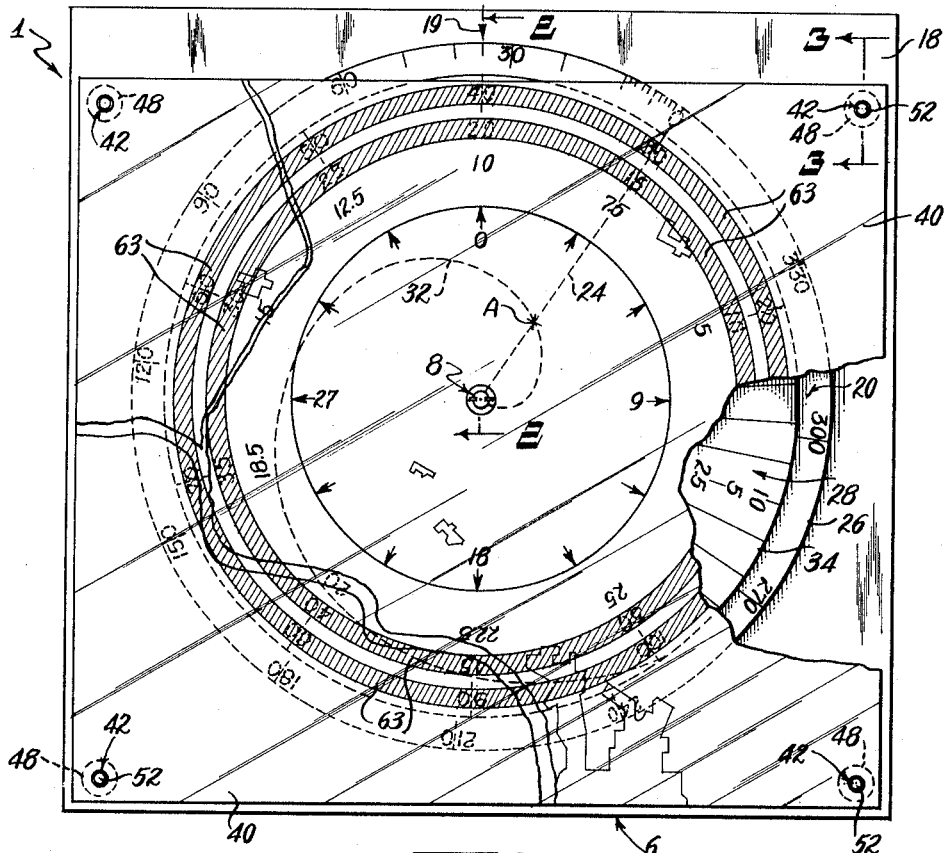
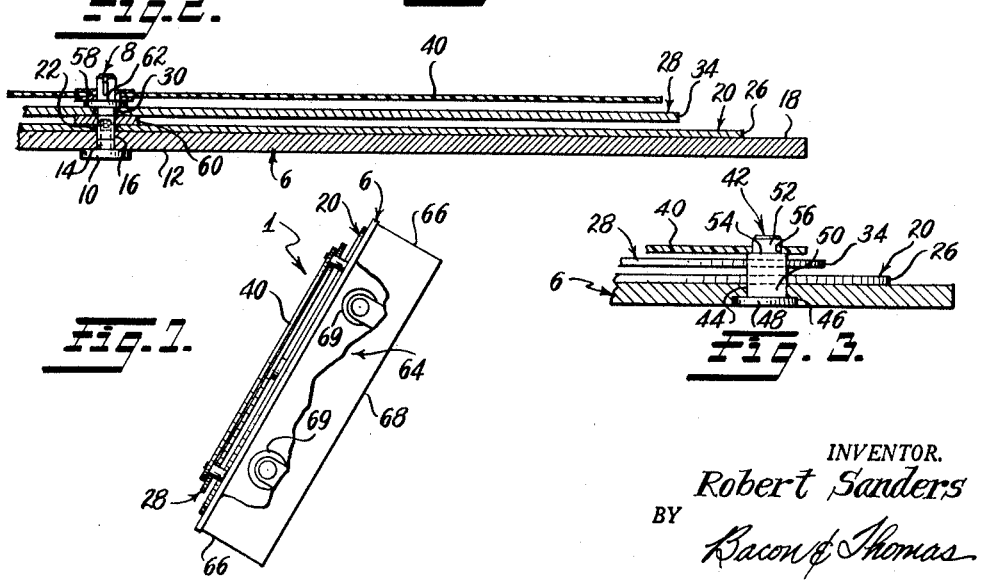
INVENTOR.
Robert Sanders
BY
Bacon & Thomas
ATTORNEYS May 25, 1965  R. SANDERS  3,184,845
NAVIGATION INSTRUMENT
Filed Nov. 16, 1960  2 Sheets-Sheet 2

INVENTOR.
Robert Sanders
BY
Bacon & Thomas
ATTORNEYS

United States Patent Office 3,184,845
Patented May 25, 1965

3,184,845
NAVIGATION INSTRUMENT
Robert Sanders, 2612 Tilden St. NW., Washington, D.C.
Filed Nov. 16, 1960, Ser. No. 69,709
1 Claim. (Cl. 33—1)

This invention relates to navigation instruments and more particularly to improvements in instruments for use in aerial navigation.

It is desirable that the pilot of an aircraft be able to see on a map the exact location of his aircraft at any time. In the past, this has been possible only with the aid of expensive, rather complex electrical devices which operate automatically in response to radio signals received from ground stations to show on a map the exact location of the aircraft at all times. Alternatively, pilots of small aircraft have customarily resorted to computing the information received and manually plotting their position on a map. This is a cumbersome operation when the pilot must man the controls of the aircraft at the same time.

It is therefore an object of the invention to provide a simple, inexpensive aerial navigation instrument which is adapted to visually indicate on a map the exact geographic location of an aircraft at any given moment.

Another object is to provide a navigation instrument which can readily be set in accordance with information received by the pilot as to his distance and directional relationship to a fixed geographic point to clearly depict his true geographic position on a map.

Another object of this invention is to provide a navigation instrument which includes discs adapted to be manually rotated with respect to a fixed map and to each other to calculate the exact location of an aircraft and indicate this position on the map.

Another object is to provide an aerial navigation instrument which is portable and entirely self-contained, needing no connection to the aircraft or to radio and navigation equipment for its operation.

These and other objects and advantages of the invention will become more apparent from the following specifications when taken in conjunction with the drawings, in which:

FIG. 1 is a top plan view of the navigation instrument, partly broken away for purposes of illustration, showing the elements set in one relationship;

FIG. 2 is an enlarged, sectional view taken on line 2—2 of FIG. 1;

FIG. 3 is an enlarged, sectional view taken on line 3—3 of FIG. 1;

FIG. 7 is a side view illustrating a modification of the instrument shown in FIGS. 1–6.

Figure 4:
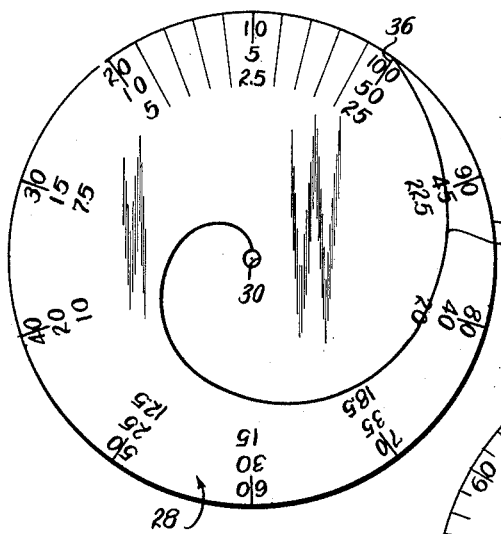
FIG. 4 is a top plan view of a calibrated mileage disc employed with the navigation instrument of FIG. 1.

The navigation instrument 1 comprises a rigid, support sheet 6 preferably formed of translucent or transparent material such as glass or plastic. The support sheet 6 may, however, be formed of opaque material, if desired. Adjacent the center of sheet 6, a vertically disposed pivot pin 8 is fixedly mounted and one suitable way of mounting pin 8 on sheet 6 is illustrated in FIG. 2. The enlarged head 10 of pivot pin 8 is seated against the bottom surface 12 of sheet 6 while the body portion 14 of pin 8 passes through an opening 16 formed in sheet 6 and projects above the top surface 18 of sheet 6. The opening 16 in sheet 6 and the body 14 of pin 8 are illustrated as being of substantially the same size so that the body 14 of pin 8 may be forced into opening 16 in order to fixedly secure the pin in the opening by a friction fit; the pin may, however, be secured in the opening by any other suitable means. A reference point 19 is formed on the upper surface 18 of sheet 6, directly above the center of pivot pin 8 and adjacent the upper edge of the sheet.

Rotatably mounted on pivot pin 8 above the upper surface of sheet 6, is a first circular disc 20 formed of transparent or translucent sheet material. A central opening 22, slightly larger in diameter than pin 8, is formed in disc 20 so that the disc may be rotated freely on pin 8. Disc 20 is provided on its upper surface with a reference line 24, extending radially of disc 20, from opening 22 at the center of the disc to the periphery 26 thereof.

Figure 5:
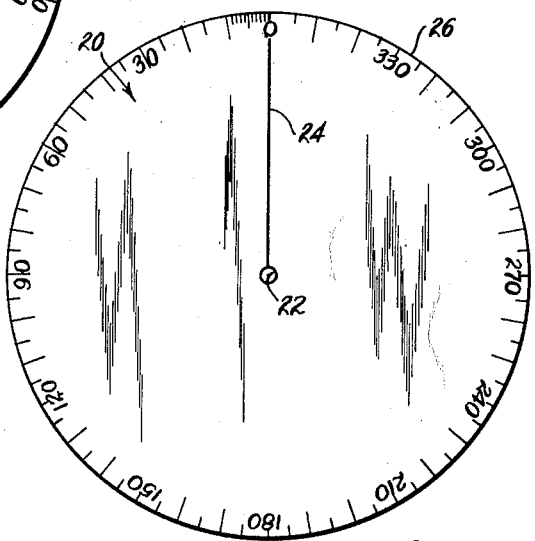
FIG. 5 is a top plan view of a directional disc employed in the instrument of FIG. 1.

The upper surface of disc 20, adjacent the outer periphery thereof, is provided with equally spaced, radially extending calibrations along its outer edge designating the three hundred and sixty degrees of a compass with the zero degree (0°) calibration coinciding with the reference line 24 and the calibrations for successive azimuth degrees extending in a counter-clockwise direction around the circumference of the disc 20 as illustrated in FIG. 5.

A second circular disc 28, formed of transparent or translucent material, is superimposed over the first disc 20 and rotatably mounted on pivot pin 8. A central opening 30, slightly larger in diameter than pin 8, is formed in disc 28 so that this disc may also be rotated freely on pin 8. Disc 28 is provided with a spiral line 32 in the form of an Archimedean spiral extending from the center of disc 28 to a point adjacent the periphery 34 thereof and circumscribes a path of three hundred and sixty degrees from the inner end of the line 32 adjacent the center of the disc to the outer end of the line adjacent the periphery thereof. The upper surface of disc 28, adjacent the outer periphery thereof is provided with equally spaced, radially extending calibrations to designate mileage corresponding proportionally to the distances of points in line 32 from the center of the disc at the respective radial positions indicated by the calibrations.

As best shown in FIG. 4, disc 28 may be provided along its outer circumference with several concentric scale-of-miles calibrations. Three such scales are shown with the outer scale designating from zero to one hundred miles, the center scale designating from zero to fifty miles and with the inner scale designating from zero to twenty-five miles, all of the scales reading in a counter-clockwise direction. The zero mile calibrations 36 for each scale lies on an imaginary radial line which passes through the points at which the inner and outer ends of the Archimedean spiral terminate.

A transparent or translucent aerial map 40 is disposed over discs 20 and 28 in non-rotatable superimposed relation thereto by any suitable means. It may, for example, be supported adjacent the corners thereof on pegs 42 which project a short distance above the top side 18 of sheet 6 and which may be fixedly secured adjacent the corners of sheet 6 in any suitable manner. As best shown in FIG. 3, sheet 6 is provided with an opening 44 which is of substantially the same diameter as the body of peg 42 and with a counterbore 46 which is slightly larger in diameter than the head 48 of peg 42. The body 50 of peg 42 may be pressed into opening 44 until the head 48 seats in counterbore 46 to secure the peg in the sheet by a friction fit. A reduced pilot portion 52 is formed at the upper end of each peg 42 and has a reduced portion smaller in diameter than the diameter of body 50 to provide a shoulder 54.

Figure 6:
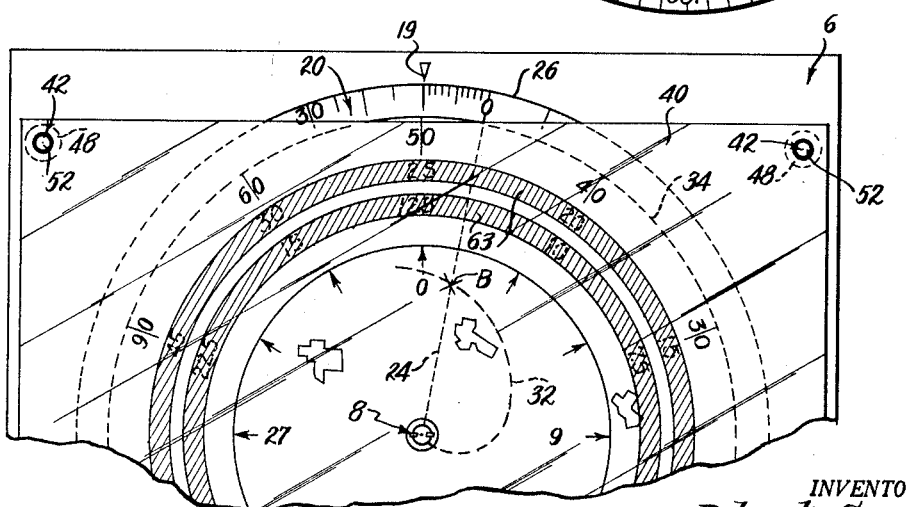
FIG. 6 is a partial, top plan view of the navigation instrument of FIG. 1 but with the discs set in a different relationship and a second map employed therewith.

Map 40 is supported on pegs 42 with the compass direction "North" coinciding with an imaginary radial line extending from the center of the map in the direction of reference point 19. As shown in FIGS. 1 and 6, the aerial map 40 has formed thereon a circle 55 concentric with the center of the map and spaced radially outwardly therefrom. Calibrations, which are provided on the circle indicate the 360 degrees of a circle and increase from "0," the compass direction indicating North and lying on the aforementioned imaginary radial line, in a clockwise direction as indicated by the numerals 9, 18, 27. These numerals are the conventional serial map abbreviations for 90 degrees, 180 degrees, and 270 degrees, respectively, and show compass directions with respect to an airport, radar station or other specific geographic location. Openings 56 are provided in the map adjacent one or more corners thereof, the openings being slightly larger in diameter than the diameter of the pilots 52 at the upper end of pegs 42. By inserting the pilots 52 through the openings 56, the map 40 will be seated on shoulders 54. The center of the map may be provided with an opening 58 through which pivot pin 8 may extend. An expansion spring or any other suitable means may be employed as a retainer at the upper end of pivot pin 8, and a similar expedient may be used, if desired, at the upper ends of pegs 42 to prevent the accidental removal or displacement of the map therefrom. A thin washer 60 may be placed around pivot pin 8, between discs 20 and 28, and the pin 8 may have a fixed flange 62 between disc 28 and map 40 respectively, in order to hold both discs and the washer in assembled relation.

The aerial map 40 is of the conventional type including thereon all of the data normally provided on such maps but also including a specific geographic location disposed at the center of the map. Normally this centrally disposed location on the map would be a radio or radar station which may furnish such information as compass direction and distance to the aircraft. The aerial maps which are adapted to be employed herein may be furnished in different mileage scales corresponding to the scales on disc 28 and may be provided with concentric opaque bands 63. These opaque bands 63 are located on the map in such a manner that they overlie and obscure all of the scale-of-miles calibrations which are provided on disc 28 with the exception of the scale which corresponds to the scale of miles of the particular map being employed.

A typical example of the operation of the navigation instrument is illustrated in FIG. 1. The destination of the pilot of an aircraft in this instance is an airport located at the center of the map. In order for the pilot to locate his exact position on the map, he is furnished, by his own radio equipment or from ground installations, his distance and direction relative to the specific geographic location represented by the center of the map. In this instance the pilot is informed that his present position is 35° east of north with respect to the aforesaid location, and disc 20 is accordingly rotated until the calibration representing 35° is positioned opposite reference point 19. It will be noted that radially extending reference line 24 of disc 20 will then extend in a generally north-northeasterly direction, as shown in FIG. 1. The pilot next determines his distance from the aforesaid geographic location by conventional means, which distance in this instance is seven and a half miles. Disc 28 is then rotated until its calibration for seven and a half miles coincides with radially extending reference line 24. The point A at which radially extending reference line 24 of disc 20 intersects the spiral line 32 on disc 28 indicates on the map the exact location of the aircraft.

FIG. 6 illustrates a second example of the operation of the navigation instrument, employing a map 40 of a smaller scale than the map illustrated in FIG. 1. In this instance, the concentric opaque areas on the map cover the middle and inner mileage calibrations and leave exposed only the outer scale which is calibrated to read counterclockwise from zero to one hundred miles, this map being four times smaller in scale than the map of FIG. 1. The pilot in this case determines that his location is 10° east of north with respect to the centrally disposed geographic location and that he is forty-seven miles from that point. The direction disc 20 is accordingly rotated until the calibration indicating 10° is positioned opposite reference point 19, and disc 28 is rotated until the scale of miles calibration 47 coincides with the radially extending reference line 24. With the discs set in this manner, it will be noted that the spiral line 32 on disc 28 intersects the radially extending reference line 24 of disc 20 at point B, thus indicating to the pilot that the position of the aircraft is over the point on the map shown by the intersection of these two lines.

The fixed geographic location disposed at the center of the map need not represent the destination of the aircraft but is usually a radio tower from which the pilot obtains his information. The distance in miles from the fixed reference point to the aircraft and the location of the aircraft in compass degrees relative thereto is all the information that is required in order for the pilot of the aircraft to set the two discs and find his location on the map. The pilot may proceed toward any destination represented on the map and may from time to time check his position on the map to determine the subsequent locations of the aircraft during the progress of the flight thereof. In practice he may start with a small scale map and switch to maps of larger scales as he approaches his destination and comes within the area represented on these larger scale maps.

A modification of the present invention is illustrated in FIG. 7 in which the navigation instrument 1 is mounted on the top of a cabinet or box 64. The box 64 comprises side walls 66 and a bottom wall 68, formed of wood, plastic, metal or any other suitable rigid material. Sheet 6, which comprises the base of navigational instrument 1, is attached to box 64 by any suitable means to form the front thereof.

Illuminating means are provided in the interior of box 64, as by electric light bulbs 69 which are powered either by batteries, not shown, carried inside box 64 or by connecting the bulbs to a source of electric current available in the aircraft. It will be apparent that the light furnished by the light bulbs 69 will pass through sheet 6, discs 20 and 28 and map 40 to clearly show the calibrations, lines and other data provided on these members. The pilot of the aircraft will be able to clearly see the calibrations on discs 20 and 28 and to set these discs accurately. The point at which radially extending reference line 24 intersects spiral line 32 will also be readily apparent on the map due to the illuminated background.

It's possible to arrange the relative location of map 40 and discs 20 and 28 differently from what is described above without altering the operation of the navigational instrument. For example, map 40 could be positioned below disc 28, in which event it would be necessary for the body of the disc to be transparent rather than merely translucent. Map 40 might also be positioned below both disc 28 and disc 20, in which event both discs would be formed of transparent material. The operation of the device would also not be altered in the event that the relative positions of the discs were reversed. In other words disc 28 may be positioned adjacent sheet 6 with disc 20 being positioned over disc 28 in superimposed relationship. In addition, if the relative positions of the discs were reversed, the map could be positioned over disc 20 in the relationship best shown in FIGS. 2 and 3 or the map might be positioned below either or both discs, as described above.

In the event that it is desirable to project the point of intersection of radial line 24 with spiral line 32 onto map 40 as a point of light, discs 20 and 28 could be formed from opaque sheet material with radial line 24 and spiral line 32 formed on discs 20 and 28, respectively, either as slits or as transparent or translucent lines on the discs. By employing opaque discs and permitting the light to pass through only along radial line 24 in disc 20 and spiral 32 in disc 28, the only light which is projected onto map 40 is the point of light which would pass through both discs at the point of intersection of the radial and spiral lines.

While the preferred embodiments of this invention have been described and illustrated, it will be apparent to those skilled in the art that various modifications, substitutions, alterations and changes may be made without departing from the spirit of this invention or the scope of the annexed claims. In this connection it should be specifically understood that the basic concept involved in this invention is not necessarily dependent upon a specific mounting means such as the pivot pin or center post 8. The discs could readily be mounted for rotation in peripheral grooves. The discs themselves may be assembled to form a single detached instrument which may be manually positioned by the user on the surface of an aerial map. Where the projection of light is contemplated the beams of light could, of course, be projected through the discs in any known manner, including the use of reflecting means. Similarly prism means or reflecting means could be employed when the position of the discs with respect to the map is such that the lines themselves are apparent. The important factor is that the geometric projection of the lines, by any known means gives a visible indication on the surface of the map at the point where these projected lines intersect.

I claim:

A navigation instrument for aircraft, comprising: a first translucent disc formed with an opening at the center thereof and having calibrations spaced along its outer circumference to designate azimuth and a radially extending reference line coinciding with the zero degree calibration; a second translucent disc formed with an opening at the center thereof and having a scale of miles calibrated along its outer circumference and a line following an Archimedean spiral, all points along said line being spaced from the center of said second disc by distances proportional to the mileage indicated by the calibrations spaced radially outwardly therefrom; a translucent map having a specific geographic reference point at the center thereof and having the compass direction indicating North spaced radially outwardly from said reference point, said second disc having a series of different scale-of-miles calibrations arranged concentrically adjacent its outer circumference; a baseboard having an upper surface; a picot pin projecting above said upper surface adjacent the center thereof, said first disc being mounted for rotation about its center on said pin, said second disc being mounted for rotation about its center above said first disc on said pin, and said map being mounted on said baseboard above said second disc with its center in alignment with said pin and with the intersection of said radial reference line with said spiral line being visible therethrough, said azimuth calibrations of said first disc arranged for cooperative alignment with said compass direction North of said map, said scale-of-miles calibrations of said second disc arranged for cooperative alignment with said radial line of said first disc, said map having a series of concentrically arranged opaque rings overlying all except a preselected one of said concentrically arranged scale-of-miles calibrations, the point of intersection of said radial reference line and said Archimedean spiral line when projected onto said map designating the exact position of said aircraft thereon when said reference line of said first disc is set to coincide with the exact direction of the aircraft from said geographic reference point and said second disc is set with the calibration designating the exact distance from said geographic reference point coinciding with said reference line of said first disc.

References Cited by the Examiner
UNITED STATES PATENTS

| | | | |
|---|---|---|---|
| 1,110,217 | 9/14 | Maull | 33—76 |
| 1,388,915 | 8/21 | Behncke | 35—40 |
| 1,638,914 | 8/27 | Brush | 33—76 |
| 2,007,986 | 7/35 | Sprague | 33—76 |
| 2,210,773 | 8/40 | Niemeyer | 33—1 |
| 2,235,177 | 3/41 | Stark | 33—1 |
| 2,357,131 | 8/44 | Putnam | 33—1 |
| 2,494,536 | 1/50 | Atwood. | |
| 2,750,671 | 6/56 | Jones | 33—1 |

FOREIGN PATENTS

| | | |
|---|---|---|
| 662,759 | 8/29 | France. |
| 63,568 | 6/49 | Netherlands. |

ISAAC LISANN, *Primary Examiner.*